United States Patent Office 2,742,393
Patented Apr. 17, 1956

2,742,393
DERIVATIVES OF 2-MERCAPTOPYRIDINE-1-OXIDE

Jack Bernstein, New Brunswick, William A. Lott, Maplewood, and Kathryn A. Losee, New Brunswick, N. J., assignors to Olin Mathieson Chemical Corporation, a corporation of Virginia No Drawing. Application May 19, 1953,
Serial No. 356,114

11 Claims. (Cl. 167—33)

This invention relates to, and has for its object the provision of: (A) compounds of the group consisting of amine-addition and quaternary ammonium salts of acids (I) of the general formula:

[structure]

wherein R represents a member of the class consisting of hydrogen, lower-alkyl, lower-alkoxy and halogen groups; and (B) methods of preparing these compounds.

The amine-addition salts (II) of the invention include, inter alia, addition salts of (higher alkyl)-amines (such as cetyl, dodecyl, octadecyl, octyl, hexyl, and myristyl amines); and addition salts of di-(lower alkyl)-(higher alkyl)-amines (such as dimethyl-cetyl, diethyl-dodecyl, dimethyl-dodecyl, dimethyl-octadecyl, and di-isopropyl-cetyl amines).

The quaternary ammonium salts (III) of the invention include (especially) compounds of the general formula:

[structure]

wherein R has the meaning given hereinbefore, $R^1$ and $R^2$ each represent a lower-alkyl group, $R^3$ represents a member of the class consisting of lower-alkyl and aralkyl groups, except when $R^1$ and $R^2$ taken together with the nitrogen atom to which they are joined represent a saturated heterocyclic group, and when $R^1$, $R^2$, and $R^3$ taken together with the nitrogen atom to which they are joined represent an unsaturated heterocyclic group, and $R^4$ represents a member of the class consisting of higher-alkyl and higher-alkenyl groups. (The alkyl and aralkyl groups may be unsubstituted or contain substituents such as hydroxy and halo.)

The compounds of this invention are active against a wide group of microorganisms, as indicated by the following *in vitro* spectrum (data on the antibacterial agent aspergillic acid being included for comparison):

TABLE I

*Antibacterial spectrum*

| Organism | M. I. C. µg./ml. | | | |
|---|---|---|---|---|
| | Aspergillic acid | Ammonium salts of 2-mercaptopyridine-1-oxide | | |
| | | cetyltrimethyl | cetyl | cetyldimethyl |
| Staphylococcus aureus P209 | 20 | 0.4 | 0.3 | 0.3 |
| Klebsiella pneumoniae | 30 | 1.5 | 1.5 | 2 |
| Bacillus of Calmette and Guerin | 4 | 0.015 | 0.01 | 0.015 |

TABLE II

*Antifungal spectrum*

| Organism | (M. I. C. µg./ml.) Ammonium salts of 2-mercaptopyridine-1-oxide | | |
|---|---|---|---|
| | Cetyltrimethyl | Cetyl | Cetyldimethyl |
| Asperigillus fumigatus | 1.6 | 0.8 | 0.8 |
| Asperigillus niger | 12 | 3 | 3 |
| Microsporum canis | | 0.8 | 0.8 |
| Alternaris solani | 0.8 | | |
| Candida albicans | 12 | 3 | 1.6 |
| Microsporum audouini | 0.4 | 0.8 | 1.6 |
| Penicillium notatum | 1.6 | 1.6 | 1.6 |
| Rhodotorula glutinis | 3 | 0.8 | 0.8 |
| Saccharomyces cerevisiae | 0.8 | 0.8 | 0.8 |
| Trichophyton mentagrophytes | 0.8 | 0.8 | 0.8 |
| Fusarium bulbigenum | 3 | 3 | 3 |
| Ceratostomella ulmi | 0.4 | 0.8 | 0.8 |

Since the compounds of this invention possess broad antibacterial and antifungal properties, they are utilizable as preservatives in a wide variety of products, as mildew-proofing agents, and for sterilization and disinfecting purposes. For example, they are useful as fungicidal plant protective agents, e. g., against Peronospora growing on grapevine.

In addition, they are valuable chemotherapeutic agents, especially fungicides, and thus are applicable in the treatment of dermatophytosis pedis and in the control of superficial fungus infections of the skin and accessible mucous membranes.

Illustrating utilization of the compounds of this invention as chemotherapeutic agents, the cetyltrimethylammonium salt of 2-mercaptopyridine-1-oxide (for example), designated as "agent" in the formulations below, may be formulated and used as follows:

A. Chemotherapeutic nose drops (to be administered intra-nasally by nebulizer, gauze pack, or drops:
  Agent _____ µg___ 50–100
  Phenylephrine hydrochloride _____ mg___ 2.5
  Phosphate buffer (to about pH 7).
B. Lubricating jelly:
  Carboxymethylcellulose _____ gm___ 20
  Agent _____ mg___ 55
  Water, q. s _____ gm___ 1010
C. Eardrops:
  Agent _____ mg___ 5
  Urea _____ gm___ 10
  Intracaine hydrochloride (β-diethylaminoethyl p-ethoxybenzoate hydrochloride) ___
  _____ gm___ .5
  Polyethyleneglycol, q. s _____ ml___ 100
D. Foot powder:
  Agent _____ µg___ 50
  Starch (with 5% talc.), q. s _____ gm___ 1
E. Ointments:
  (1) White wax _____ gm___ 5
    White petroleum jelly _____ gm___ 64
    Peanut oil (or mineral oil) _____ gm___ 31
    Agent _____ µg./gm___ 100–1000
  (2) Stearic acid _____ gm___ 12.5
    Span 65 _____ gm___ 10
    Tween 60 _____ gm___ 6
    Antioxidant _____ gm___ 0.13
    Agent _____ µg./gm___ 100–1000
    Water _____ gm___ 71.5

| (3) Cetyl alcohol | gm | 7 |
| Stearyl alcohol | gm | 3 |
| Beeswax white | gm | 4 |
| Petroleum white | gm | 27 |
| Glycerin | gm | 8 |
| Sodium lauryl sulfate | gm | 1 |
| Antioxidant | gm | 0.13 |
| Agent | μg./gm | 100–1000 |
| Water | gm | 50 |

The amine-addition salts of the invention (II) may be prepared by the method comprising interacting an amine, preferably a higher-alkyl amine, with a 2-mercaptopyridine-1-oxide of the general formula:

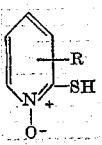

(wherein R has the meaning given hereinbefore) in a substantially dry organic solvent; and recovering the reaction product.

The compounds (III) of this invention may be prepared by interacting a quaternary ammonium compound (IV) of the general formula:

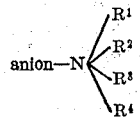

with an alkali salt of a 2-mercaptopyridine-1-oxide of the general formula:

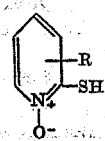

(wherein R, $R^1$, $R^2$, $R^3$, and $R^4$ have the meaning given hereinbefore), and recovering the reaction product.

The alkali salts of the 2-mercaptopyridine-1-oxide reactants include the alkali-metal (including ammonium) and alkaline-earth-metal salts, inter alia, the barium, potassium, calcium, ammonium, or sodium salts of 2-mercaptopyridine-1-oxide, 3-ethoxy-2-mercaptopyridine-1-oxide, 2-mercapto-3-methoxypyridine-1-oxide, 5-bromo-2-mercaptopyridine-1-oxide, 2-mercapto-3-methylpyridine-1-oxide, 2-mercapto-4-methylpyridine-1-oxide, 2-mercapto-5-methylpyridine-1-oxide, 2-mercapto-6-methylpyridine-1-oxide, and 2-mercapto-6-propylpyridine-1-oxide. (See for example, JACS 72:4362 for preparation of substituted 2-mercaptopyridine-1-oxides, and application Ser. No. 330,576, filed January 9, 1953.)

In the quaternary ammonium reactants (IV) of the general formula:

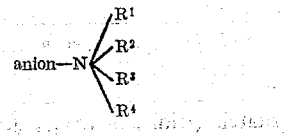

($R^1$, $R^2$, $R^3$, and $R^4$ having the meaning given hereinbefore), the nature of the anionic group is relatively unimportant; thus the utilizable salts include, inter alia, nitrates, acetates, benzoates, salicylates, hydrocinnamates, α-amylcinnamates, sulfates, methosulfates, ethosulfates, cyanides, oleates, laurates, sec-orthophosphates, and (especially) the halides (bromides, iodides, and chlorides).

The reactants (IV) include compounds having the following cationic groups, inter alia: n-hexyltrimethylammonium; n-octyltrimethylammonium; dodecyltrimethylammonium; myristyltrimethylammonium; octadecyltrimethylammonium; octadecyl-β-hydroxyethyldimethylammonium; cetyltrimethylammonium; cetyldimethylethylammonium; cetyltriethylammonium; n-butylcetyldimethylammonium; cetyl-2,3-dihydroxypropyldimethylammonium; cetyldiethyl-β-hydroxyethylammonium; octadecenyldimethylethylammonium; cetyl-di-n-propyl-(β-hydroxyethyl)-ammonium; cetylmethylpiperidinium; cetylethylpiperidinium; dodecylethylpiperidinium; dodecylpyridinium; cetylpyridinium; p-tert-octylethoxyethylpyridinium; octylpyridinium; octadecenylpyridinium; cetylpicolinium; benzyldimethyldodecylammonium; benzyldimethylpentadecylammonium; benzylcetyldimethylammonium; cetyl-o-chlorobenzyldimethylammonium; benzylcetyldiethylammonium; benzylcetylethylpropylammonium; dedecyldimethyl-3,4-dichlorobenzylammonium; benzyldimethyloleylammonium; (1-phenyldodecyl)-dimethylcinnamylammonium; dimethylethyl-9-octadecenylammonium; (p-tert-octylphenoxyethoxyethyl)-trimethylammonium; (2,2,4,4-tetramethylbutylphenoxyethoxyethyl)-dimethylbenzylammonium; (p-tert-octylphenoxyethoxyethyl)-dimethylbenzylammonium; (p-tert-octylphenoxyethoxyethyl)-diethylbenzylammonium; and (p-tert-octylcresoxyethoxyethyl)-dimethylbenzylammonium.

Preferably, in the practice of this invention the reactant (IV) and the alkali salt of the 2-mercaptopyridine-1-oxide are interacted in a solvent for the reactants, the anion of the former and the cation of the latter being so chosen that the salt combination thereof is insoluble in said solvent. For example, a quaternary ammonium halide interacted with the alkali-metal salt of a 2-mercaptopyridine-1-oxide in a substantially dry hydroxylated organic solvent (inter alia, absolute alcohol, ethylene glycol, and propylene glycol); or a quaternary ammonium sulfate interacted with an alkaline-earth-metal salt of a 2-mercaptopyridine-1-oxide in a substantially aqueous solution.

Alternatively, compounds of the invention having the following general formula:

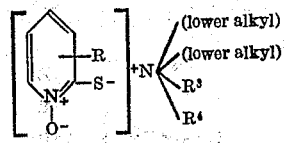

may be prepared by interacting a compound (V) of the general formula:

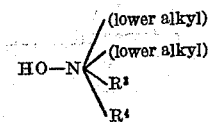

with a 2-mercaptopyridine-1-oxide of the formula

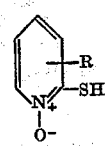

in a substantially aqueous medium, and recovering the reaction product. [R, $R^3$ and $R^4$ have the meaning given hereinbefore.] Reactant (V) may be prepared, inter alia, by interacting the quaternary reactant (IV) in which the anion is a halogen with silver oxide; when the anion is sulfate, by treatment with an equivalent amount of barium hydroxide; or when the anion is halide or sulfate, for example, by passing it through a suitable anion-exchange column.

The following examples are illustrative, but by no means limitative, of the invention.

EXAMPLE 1

A solution of 3.89 g. of the barium salt of 2-mercaptopyridine-1-oxide [prepared by interacting 2-mercaptopyridine-1-oxide (JACS 72:4362) and barium hydroxide] in 20 cc. of water is added to a solution of 6.65 g. cetyltrimethylammonium sulfate in 75 cc. of water. The precipitated barium sulfate is removed by filtration, and the filtrate is freeze-dried to yield about 8 g. of the product, the cetyltrimethylammonium salt of 2-mercaptopyridine-1-oxide, M. P. 152–158° C. (with decomposition).

Using 7.85 g. cetyl-2,3-dihydroxypropyldimethylammonium sulfate or 11.82 g. cetyltriethylammonium sulfate, in place of the cetyltrimethylammonium sulfate in Example 1, yields the cetyl-2,3-dihydroxypropyldimethylammonium salt of 2-mercaptopyridine-1-oxide and cetyltrimethylammonium salt of 2-mercaptopyridine-1-oxide, respectively.

Using 7.69 g. (p-tert.-octylphenoxyethoxyethyl)-trimethylammonium sulfate, in place of cetyltrimethylammonium sulfate in Example 1, yields the (p-tert.-octylphenoxyethoxyethyl)-trimethylammonium salt of 2-mercaptopyridine-1-oxide.

*Alternative method*

A solution of 36.4 g. cetyltrimethylammonium bromide in 1 liter of water is shaken for twenty-four hours with 23.1 g. silver oxide, protected from light. The solid is removed by centrifugation and the supernatant filtered. The filtrate is neutralized (pH 8.3) by the addition of 11.4 g. of 2-mercaptopyridine-1-oxide; and the resulting clear solution is freeze-dried to yield a white, non-hygroscopic solid, cethyltrimethylammonium salt of 2-mercaptopyridine-1-oxide weighing about 39 g. and melting at about 148–152° C. (This compound can be crystallized from a mixture of 50 cc. absolute alcohol and 1000 cc. hexane.)

*Anal.*—Calcd. for $C_{24}H_{46}ON_2S$: C, 70.18; H, 11.29. Found: C, 69.95; H, 11.63.

(Alternatively, instead of using the silver oxide, an anion exchange resin is employed to remove the bromide ion from the cetyltrimethylammonium bromide, and the method continued as indicated hereinbefore.)

Using molar equivalents of 3-ethoxy-2-mercaptopyridine-1-oxide or 5-bromo-2-mercaptopyridine-1-oxide, in place of the 2-mercaptopyridine-1-oxide in this alternative method, yields the cetyltrimethylammonium salts of 3-ethoxy-2-mercaptopyridine-1-oxide and 5-bromo-2-mercaptopyridine-1-oxide, respectively.

Using 33.6 g. tetradecyltrimethylammonium bromide, in place of cetyltrimethylammonium bromide in the alternative method, yields the tetradecyltrimethylammonium salt of 2-mercaptopyridine-1-oxide.

Using 34 g. of dodecylbenzyldimethylammonium chloride, in place of cetyltrimethylammonium bromide in the alternative method, yields the dodecylbenzyldimethylammonium salt of 2-mercaptopyridine-1-oxide.

EXAMPLE 2

A solution of 2.21 g. laurylpyridinium chloride in 75 cc. of water is added to a solution of 1 g. of 2-mercaptopyridine-1-oxide in 30 cc. of water containing 0.312 g. sodium hydroxide. The solution is freeze-dried, and the freeze-dried solid is suspended in 75 cc. of absolute alcohol. The sodium chloride formed is insoluble in the alcohol and is removed by centrifuging the solution. The alcohol solution of the product is concentrated to dryness under reduced pressure; and the residue is then dissolved in water and freeze-dried to yield about 2.5 g. of the product, the laurylpyridinium salt of 2-mercaptopyridine-1-oxide.

*Anal.*—Calcd. $C_{22}H_{34}ON_2S \cdot H_2O$: C, 67.31; H, 9.22; N, 7.14. Found: C, 68.02; H, 9.38; N, 6.80.

Using 2.68 g. cetyl pyridinium chloride, in place of laurylpyridinium chloride in Example 2, yields the cetylpyridinium salt of 2-mercaptopyridine-1-oxide.

EXAMPLE 3

A solution of 4.17 g. of the barium salt of 2-mercapto-6-methylpyridine-1-oxide (JACS 72:4362) in 25 cc. water is added to a solution of 6.65 g. cetyltrimethylammonium sulfate in 75 cc. water. The precipitated barium sulfate is removed by filtration and the filtrate freeze-dried to yield about 8 g. of the product, the cetyltrimethylammonium salt of 2-mercapto-6-methylpyridine-1-oxide.

*Alternative*

A solution of 36.4 g. of cetyltrimethylammonium bromide in 1 liter of water is shaken for 24 hours with 23.1 g. silver oxide, protected from light. The solid is removed by centrifugation and the supernatant is filtered. The filtrate is neutralized (pH 8.5) by the addition of 12.8 g. 2-mercapto-6-methylpyridine-1-oxide and the resulting clear solution freeze-dried to yield about 40 g. of the white, non-hygroscopic solid product.

EXAMPLE 4

A solution of 1.27 g. of 2-mercaptopyridine-1-oxide in 3 cc. absolute alcohol is added to a solution of 2.41 g. cetylamine in 1 cc. absolute alcohol. About 25 cc. dry ether is added and, after cooling and scratching, crystallization occurs. The crystalline solid which weighs about 2.7 g. and melts at about 78–80° C. is the cetylamine salt of 2-mercaptopyridine-1-oxide. (After recrystallization from alcohol-ether, the compound melts at about 79–81° C.)

Using a molar equivalent of octylamine, in place of cetylamine in Example 4, yields the octylamine salt of 2-mercaptopyridine-1-oxide.

EXAMPLE 5

A solution of 1.27 g. of 2-mercaptopyridine-1-oxide in 5 cc. absolute alcohol is added to 2.69 g. of cetyldimethylamine. About 25 cc. dry ether is added and after cooling and scratching crystallization occurs. The solid, weighing about 2 g. and melting at 62–63° C. is the cetyldimethylamine salt of 2-mercaptopyridine-1-oxide. (After recrystallization from alcohol-ether, the melting point was 63–64° C.)

Using a molar equivalent of lauryldiethylamine, in place of cetyldimethylamine in Example 5, yields the lauryldiethylamine salt of 2-mercaptopyridine-1-oxide.

The invention may be variously otherwise embodied within the scope of the appended claims.

We claim:

1. Salts of the group consisting of: amine-addition salts of the general formula

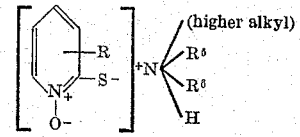

wherein $R^5$ and $R^6$ are each members of the class consisting of hydrogen and lower-alkyl; and quaternary ammonium salts of the general formula:

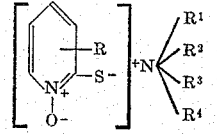

wherein $R'$ and $R^2$ each represent a lower-alkyl group; $R^3$ represents a member of the class consisting of lower-alkyl and a benzyl group, except when $R'$ and $R^2$ taken together with the nitrogen atom to which they are joined represent a piperidyl group, and when $R'$, $R^2$ and $R^3$ taken together with the nitrogen atom to which they are joined represent a pyridyl group; $R^4$ represents a member of the class consisting of higher-alkyl and higher-alkenyl groups; and R represents a member of the class consisting of hydrogen, lower-alkyl, lower-alkoxy and halogen groups.

2. Quaternary ammonium salts of the general formula:

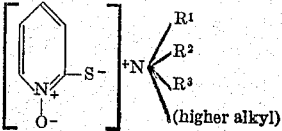

wherein $R'$, $R^2$ and $R^3$ taken together with the nitrogen atom to which they are joined represent a pyridyl group.

3. (Higher alkyl)-tri-(lower alkyl)-ammonium salts of 2-mercaptopyridine-1-oxide of the general formula:

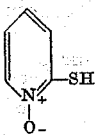

4. (A benzyl)-di-(lower alkyl)-(higher alkyl)-ammonium salt of 2-mercaptopyridine-1-oxide.

5. Cetyl-trimethyl-ammonium salt of 2-mercaptopyridine-1-oxide.

6. Lauryl pyridinium salt of 2-mercaptopyridine-1-oxide.

7. The method which essentially comprises interacting a quaternary ammonium compound of the general formula:

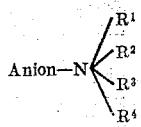

wherein $R^1$ and $R^2$ each represent a lower-alkyl group, $R^3$ represents a member of the class consisting of lower-alkyl and a benzyl group, excpet when $R^1$ and $R^2$ taken together with the nitrogen atom to which they are joined represent a piperidyl group, and when $R^1$, $R^2$ and $R^3$ taken together with the nitrogen atom to which they are joined represent a pyridyl group, and $R^4$ represents a member of the class consisting of higher-alkyl and higher-alkenyl groups with an alkali salt of a 2-mercaptopyridine-1-oxide of the general formula:

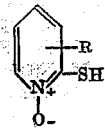

wherein R represents a member of the class consisting of hydrogen, lower-alkyl, lower-alkoxy, and halogen groups; and recovering the reaction product.

8. The method which comprises interacting a quaternary compound of the general formula:

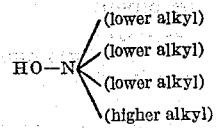

with a 2-mercaptopyridine-1-oxide of the general formula:

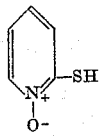

9. A fungicidal plant protective preparation comprising as a fungicidal agent a salt of the class consisting of: the amine-addition salts and quaternary ammonium salts of claim 1.

10. A fungicidal plant protective preparation for grapevine comprising as a fungicidal agent a salt of the class consisting of: the amine-addition salts and quaternary ammonium salts of claim 1.

11. The method of protecting grapevines against Peronospora comprising applying a salt of the class consisting of: the amine-addition and quaternary ammonium salts of claim 1.

References Cited in the file of this patent

Itai, Chem. Abst., vol. 44, pp. 4473–4 (1950).